United States Patent [19]

Kanda et al.

[11] Patent Number: 4,681,690

[45] Date of Patent: Jul. 21, 1987

[54] STABILIZED FRACTURING FLUID AND METHOD OF STABILIZING FRACTURING FLUID

[75] Inventors: Shoichi Kanda, Kanagawa; Makoto Yanagita, Tokyo; Yukihiko Sekimoto, Saitama, all of Japan

[73] Assignee: Nitto Chemical Industry Co., Ltd., Tokyo, Japan

[21] Appl. No.: 819,329

[22] Filed: Jan. 16, 1986

[30] Foreign Application Priority Data

Jan. 16, 1985 [JP] Japan .................................. 60-4011

[51] Int. Cl.$^4$ ............................................. E21B 43/26
[52] U.S. Cl. ............................. 252/8.551; 252/315.3; 536/114
[58] Field of Search ............ 252/8.5 C, 8.55 R, 315.3; 536/114

[56] References Cited

U.S. PATENT DOCUMENTS

| | | | |
|---|---|---|---|
| 3,146,200 | 8/1964 | Goldstein et al. | 252/8.55 X |
| 4,151,096 | 4/1979 | Jackson | 252/8.55 X |
| 4,317,759 | 3/1982 | Kanda et al. | 524/93 |
| 4,486,317 | 12/1984 | Sandell | 252/8.55 X |
| 4,514,318 | 4/1985 | Rodriguez | 252/315.3 |
| 4,552,668 | 11/1985 | Brown et al. | 252/8.55 X |

*Primary Examiner*—Herbert B. Guynn
*Attorney, Agent, or Firm*—Sughrue, Mion, Zinn, Macpeak, and Seas

[57] ABSTRACT

A stabilized fracturing fluid and a method of stabilizing a fracturing fluid containing at least one of guar gum and a derivative thereof is disclosed, comprising adding at least one stabilizing compound selected from 2-mercaptobenzimidazole and 2-mercaptobenzothiazole compounds to the fracturing fluid. This stabilization prevents degradation of the fracturing fluid, i.e., reduction in its rheological properties at high temperatures and permits smoothly carrying out the fracturing operation.

10 Claims, No Drawings

STABILIZED FRACTURING FLUID AND METHOD OF STABILIZING FRACTURING FLUID

BACKGROUND OF THE INVENTION

The present invention relates to a stabilized fracturing fluid and to a method of stabilizing a fracturing fluid. More particularly, it is concerned with a stabilized fracturing fluid and with a method of stabilizing a fracturing fluid, which thereby permits smoothly carrying out fracturing operations by preventing a reduction in rheological properties of the fracturing fluid at high temperatures.

In recent years, to increase the production of oil and gas, a fracturing technique has been widely used in which a fluid is injected under high pressure in rock-forming oil and gas layers to break the rock and form cracks therein and, at the same time, a proppant (propping agent) such as coarse sand is introduced to hold or maintain the cracks, thereby accelerating the production of oil and gas.

As a fluid for use in this fracturing, that is, a fracturing fluid, water with a polymer dissolved therein or with a polymer dissolved and cross-linked therein is mainly used. One of the major functions required for the fluid is to have rheological properties that permit cracks to be formed in the reservoir and convey a proppant thereinto. Another function is that a fluid efficiency, that is, leak-off, is small. As polymers for use in the fluid, guar gum and/or derivatives thereof, such as hydroxypropylguar, hydroxyethylguar and carboxymethylguar are mainly used.

Commercial success in the exploration of oil and gas is recently difficult unless the prospecting for oil and gas is conducted in a deeper stratum. For this reason, the temperature of the stratum tends to rise and, in many cases, it reaches 90° C. or more.

At such high temperatures, the guar gum and/or derivatives thereof used in the fracturing fluid are deteriorated or decomposed. This leads to a reduction in rheological properties of the fluid and creates a serious obstacle to the fracturing operation. Accordingly, the inherent functions of the fracturing fluids can be satisfactorily obtained if its rheological properties can be prevented from degradation (e.g., caused by decomposition) even at elevated temperatures.

SUMMARY OF THE INVENTION

The present invention is intended to overcome the above problems and the object of the present invention is to provide an aqueous fracturing fluid and a method whereby an aqueous fracturing fluid containing guar gum and/or derivatives thereof is prevented from degradation at elevated temperatures.

It has been found that the object of the invention in one embodiment can be attained by adding at least one of 2-mercaptobenzimidazole and 2-mercaptobenzothiazole compounds to the fracturing fluid containing at least one of guar gum and a derivative thereof.

The present invention in another embodiment provides a method of stabilizing a fracturing fluid containing at least one of guar gum and a derivative thereof, which comprises adding at least one stabilizing compound selected from 2-mercaptobenzimidazole and 2-mercaptobenzothiazole compounds to the fracturing fluid.

DETAILED DESCRIPTION OF THE INVENTION

In accordance with the present invention, at least one compound selected from 2-mercaptobenzimidazole and 2-mercaptobenzothiazole compounds is added to the fracturing fluid containing at least one of guar gum and derivatives thereof. Addition of such compounds provides a fracturing fluid with rheological properties which are much superior at high temperatures compared to those of fracturing fluid not containing such compounds.

2-Mercaptobenzimidazole and 2-mercaptobenzothiazole compounds preferably used as a stabilizing compound in the present invention are represented by formulae (1) and (2), respectively.

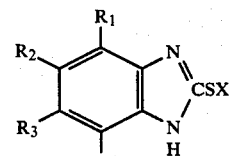

(1)

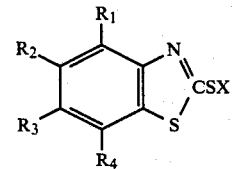

(2)

wherein $R_1$, $R_2$, $R_3$, and $R_4$ each represents a hydrogen atom or a lower alkyl group (particularly preferably a methyl group or an ethyl group), and X is a hydrogen atom, an alkali metal atom, or an ammonium group.

It is preferred for the stabilizing compound to be added in an amount of from 0.001 to 0.1 part by weight per 100 parts by weight of the fracturing fluid. If the amount of the compound added is less than 0.001 part by weight, the stabilization effect tends to be poor. On the other hand, even if the compound is added in an amount exceeding 0.1 part by weight, no additional effect can be obtained; that is, the effect obtained is almost the same as that obtained by addition of 0.1 part by weight of the compound. Thus, addition of the compound in such an amount as to exceed 0.1 part by weight is not preferred from an economic standpoint.

The stabilizing compounds of the present invention can be added to the fracturing fluid in various manners. For example, the compound may be added directly to the fracturing fluid, or the compound may be previously added to guar gum and/or derivatives thereof, or the compound may be added during the production of guar gum and/or derivatives thereof.

Guar gum is obtained from seeds of a bean plant called *Cyanaposis Tetragonolobus* and is widely used. Its derivatives such hydroxypropylguar, hydroxyethylguar and carboxymethylguar are also widely used.

The total content of guar gum and derivatives thereof in the fracturing fluid is generally from 0.01 to 30 wt%, and preferably from 0.02 to 15 wt%, based on the total weight of the fracturing fluid.

Additives which are commonly used in conventional fracturing fluids, such as a viscosifier (e.g., hydroxyethyl cellulose and carboxymethylhydroxyethyl cellulose), hydrocarbons, methanol, a cross-linking agent, a surfactant, a pH adjusting agent, a fluid loss-adjusting agent, a proppant, and a clay swell-inhibiting agent, can be added to the fracturing fluid.

A fracturing fluid with the stabilizing compound of the present invention added thereto was stored at high temperatures of from about 90° C. to about 200° C. By comparison of the above fracturing fluid with the original fracturing fluid not containing the stabilizing compound of the present invention, it can be seen that rheological properties, i.e., the apparent viscosity (AV), the plastic viscosity (PV) and the yield point (YP) of the former fracturing fluid are relatively high. Thus, the stabilizing fluid and the method of stabilization of the present invention permits smoothly carrying out the fracturing operation.

The present invention is described below in greater detail with reference to the following examples.

In the field, the reproducibility of fracturing fluid degradation determinations is a problem because of the difficulty of controlling the conditions of temperature and pressure.

Thus, in testing the following examples, the fracturing fluids were aged at a high temperature in a roller oven. Then, its rheological properties were measured at 25° C. with a Fann VG meter Model 35, and the stabilization of the present invention was compared with the conventional method using fracturing fluid not containing the compound of the present invention.

EXAMPLES 1 TO 4 AND COMPARATIVE EXAMPLE 1

Guar gum (1 wt% viscosity as measured with a Brookfield viscometer (No. 3 spindle at 6 rpm and 25° C.: 7,800 cp) was dissolved in synthetic sea water (according to ASTM D-1141; hereinafter all references to synthetic sea waters are according to ASTM D-1141) in such a manner that the concentration was 1 wt%, thereby preparing a fracturing fluid. To 100 parts by weight of the fracturing fluid thus prepared was added a 2-mercaptobenzimidazole sodium salt (MBI.Na) in an amount of 0.003, 0.01, 0.03, or 0.1 part by weight. The fracturing fluid not containing MBI.Na and each of the fracturing fluid with MBI.Na added thereto were aged at 120° C. for 6 hours, respectively. Then, the rheological properties were measured. The results are shown in Table 1.

TABLE 1

| Example No. | Amount of MBI.Na (parts by weight) | AV (cp) | PV (cp) | YP (lb/100 ft$^2$) |
| --- | --- | --- | --- | --- |
| Comparative | | | | |
| Example 1 | None | 7 | 6 | 0 |
| Example 1 | 0.003 | 30 | 20 | 17 |
| Example 2 | 0.01 | 59 | 22 | 69 |
| Example 3 | 0.03 | 64 | 24 | 80 |
| Example 4 | 0.1 | 69 | 24 | 86 |

EXAMPLES 5 TO 8 AND COMPARATIVE EXAMPLE 2

The same guar gum as used in Example 1 was dissolved in synthetic sea water in a concentration of 1 wt% to prepare a fracturing fluid. To 100 parts by weight of the fracturing fluid was added 2-mercaptobenzimidazole (MBI) in an amount of 0.005, 0.01, 0.05 or 0.1 part by weight. The fracturing fluid not containing MBI and each of the fracturing fluids with MBI added thereto were aged at 100° C. for 6 hours, respectively. Then, the rheological properties were measured. The results are shown in Table 2.

TABLE 2

| Example No. | Amount of MBI (parts by weight) | AV (cp) | PV (cp) | YP (lb/100 ft$^2$) |
| --- | --- | --- | --- | --- |
| Comparative | | | | |
| Example 2 | None | 10 | 9 | 1 |
| Example 5 | 0.005 | 40 | 20 | 69 |
| Example 6 | 0.01 | 44 | 21 | 76 |
| Example 7 | 0.05 | 50 | 21 | 80 |
| Example 8 | 0.1 | 50 | 21 | 81 |

EXAMPLES 9 TO 12 AND COMPARATIVE EXAMPLE 3

Hydroxypropylguar (1 wt% viscosity as measured with a Brookfield viscometer (No. 3 spindle at 6 rpm and 25° C.: 6,800 cp) was dissolved in synthetic sea water in a concentration of 0.6 wt% to prepare a fracturing fluid. To 100 parts by weight of the fracturing fluid thus prepared was added the sodium salt of 2-mercaptobenzimidazole substituted with a methyl group in the nucleus thereof (MMBI.Na) in an amount of 0.002, 0.006, 0.02, or 0.06 part by weight. The fracturing fluid not containing MMBI.Na and each of the fracturing fluids with MMBI.Na added thereto were aged at 130° C. for 8 hours, respectively. Then, the rheological properties were measured. The results are shown in Table 3.

TABLE 3

| Example No. | Amount of MMBI.Na (parts by weight) | AV (cp) | PV (cp) | YP (lb/100 ft$^2$) |
| --- | --- | --- | --- | --- |
| Comparative | | | | |
| Example 3 | None | 10 | 7 | 1 |
| Example 9 | 0.002 | 21 | 14 | 28 |
| Example 10 | 0.006 | 26 | 15 | 39 |
| Example 11 | 0.02 | 30 | 16 | 44 |
| Example 12 | 0.06 | 32 | 16 | 47 |

EXAMPLES 13 TO 16

Guar gum as used in Example 1 was dissolved in synthetic sea water in a concentration of 1 wt% to prepare a fracturing fluid. To 100 parts by weight of the fracturing fluid thus prepared was added the sodium salt of 2-mercaptobenzothiazole (MBT.Na) in an amount of 0.003, 0.01, 0.03 or 0.1 part by weight. The fracturing fluid not containing MBT.Na and each of the fracturing fluids with MBT.Na added thereto were aged at 130° C. for 8 hours, respectively. Then, the rheological properties were measured. The results are shown in Table 4.

TABLE 4

| Example No. | Amount of MBT.Na (parts by weight) | AV (cp) | PV (cp) | YP (lb/100 ft$^2$) |
| --- | --- | --- | --- | --- |
| Comparative | | | | |
| Example 4 | None | 6 | 5 | 0 |
| Example 13 | 0.003 | 26 | 18 | 11 |
| Example 14 | 0.01 | 49 | 22 | 38 |
| Example 15 | 0.03 | 60 | 23 | 72 |
| Example 16 | 0.1 | 61 | 23 | 74 |

EXAMPLES 17 TO 20 AND COMPARATIVE EXAMPLE 5

The same hydroxypropylguar as used in Example 5 was dissolved in synthetic sea water in a concentration of 1 wt% to prepare a fracturing fluid. To 100 parts by weight of the fracturing fluid thus prepared was added 2-mercaptobenzothiazole (MBT) in an amount of 0.003, 0.01, 0.03 or 0.1 part by weight. The fracturing fluid not containing MBT and each of the fracturing fluids with MBT added thereto was aged at 140° C. for 3 hours. Then, the rheological properties were measured. The results are shown in Table 5.

TABLE 5

| Example No. | Amount of MBT (parts by weight) | AV (cp) | PV (cp) | YP (lb/100 ft²) |
| --- | --- | --- | --- | --- |
| Comparative | | | | |
| Example 5 | None | 26 | 15 | 39 |
| Example 17 | 0.003 | 54 | 31 | 60 |
| Example 18 | 0.01 | 78 | 33 | 80 |
| Example 19 | 0.03 | 83 | 34 | 92 |
| Example 20 | 0.1 | 86 | 34 | 103 |

From the above results it is apparent that the stabilized fracturing fluid and the method of stabilizing a fracturing fluid according to the present invention are quite excellent.

While the invention has been described in detail and with reference to specific embodiments thereof, it will be apparent to one skilled in the art that various changes and modifications can be made therein without departing from the spirit and scope thereof.

What is claimed is:

1. A method of stabilizing an aqueous fracturing fluid containing at least one polymer selected from the group consisting of (1) guar gum and (2) at least one derivative of guar gum selected from the group consisting of hydroxypropylguar, hydroxyethylguar and carboxymethylguar, wherein the said at least one polymer is present in an amount effective to aid in preventing the reduction of rheological properties of the fracturing fluid, which comprises adding at least one stabilizing compound selected from 2-mercaptobenzimidazole and 2-mercaptobenzothiazole compounds to the fracturing fluid, wherein the 2-mercaptobenzimidazole and 2-mercaptobenzothiazole compounds are represented by formulae (1) and (2) respectively:

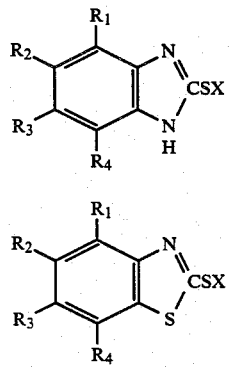

wherein $R_1$, $R_2$, $R_3$, and $R_4$, each represents a hydrogen atom or a lower alkyl group, and X is a hydrogen atom, an alkali metal atom, or an ammonium group.

2. A method of stabilizing an aqueous fracturing fluid as in claim 1, wherein said lower alkyl group is a methyl group or an ethyl group.

3. A method of stabilizing an aqueous fracturing fluid as in claim 1, wherein the stabilizing compound is added in an amount of from 0.001 to 0.1 part by weight per 100 parts by weight of the fracturing fluid.

4. A method of stabilizing an aqueous fracturing fluid as in claim 1, wherein the total content of said at least one polymer is from 0.01 to 30 wt%, based on the total weight of the fracturing fluid.

5. A method of stabilizing an aqueous fracturing fluid as in claim 1, wherein the total content of said at least one polymer is from 0.02 to 15 wt%, based on the total weight of the fracturing fluid.

6. A stabilized aqueous fracturing fluid containing at least one polymer selected from the group consisting of (1) guar gum and (2) at least one derivative of guar gum selected from the group consisting of hydroxypropylguar, hydroxyethylguar and carboxymethylguar, wherein said at least one polymer is present in an amount effective to aid in preventing the reduction of rheological properties of the fracturing fluid and at stabilizing amount of at least one stabilizing compound selected from the group consisting of 2-mercaptobenzimidazole and 2-mercaptobenzothiazole compounds, wherein the 2-mercaptobenzimidazole and 2-mercaptobenzothiazole compounds are represented by the formulae (1) and (2), respectively:

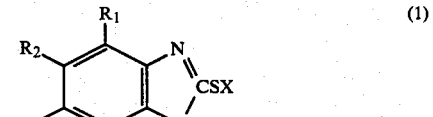

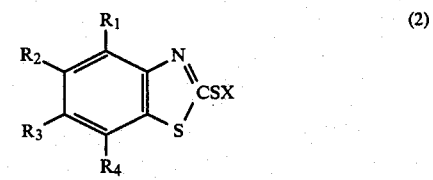

wherein $R_1$, $R_2$, $R_3$, and $R_4$, each represents a hydrogen atom or a lower alkyl group, and X is a hydrogen atom, an alkali metal atom, or an ammonium group.

7. The stabilized aqueous fracturing fluid as in claim 6, wherein said lower alkyl group is a methyl group or an ethyl group.

8. The stabilized aqueous fracturing fluid as in claim 6, wherein the stabilizing compound is added in an amount of from 0.001 to 0.1 part by weight per 100 parts by weight of the fracturing fluid.

9. The stabilized aqueous fracturing fluid as in claim 6, wherein the total content of said at least one polymer is from 0.01 to 30 wt%, based on the total weight of the fracturing fluid.

10. The stabilized aqueous fracturing fluid as in claim 9, wherein the total content of said at least one polymer is from 0.02 to 15 wt%, based on the total weight of the fracturing fluid.

* * * * *